United States Patent
Gu et al.

(10) Patent No.: US 12,370,760 B2
(45) Date of Patent: Jul. 29, 2025

(54) METHOD FOR PREPARING A PULTRUDED POLYURETHANE COMPOSITE

(71) Applicant: Covestro Deutschland AG, Leverkusen (DE)

(72) Inventors: Yongming Gu, Shanghai (CN); Zhijiang Li, Shanghai (CN); Frank Wu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 141 days.

(21) Appl. No.: 18/023,188

(22) PCT Filed: Sep. 1, 2021

(86) PCT No.: PCT/EP2021/074178
§ 371 (c)(1),
(2) Date: Feb. 24, 2023

(87) PCT Pub. No.: WO2022/053376
PCT Pub. Date: Mar. 17, 2022

(65) Prior Publication Data
US 2023/0356483 A1 Nov. 9, 2023

(30) Foreign Application Priority Data
Sep. 8, 2020 (CN) .................. 202010938117.X
Nov. 9, 2020 (EP) ...................... 20206345

(51) Int. Cl.
*B29C 70/52* (2006.01)
*B29C 70/00* (2006.01)
(Continued)

(52) U.S. Cl.
CPC .......... *B29C 70/521* (2013.01); *B29C 70/003* (2021.05); *C08G 18/672* (2013.01);
(Continued)

(58) Field of Classification Search
CPC ... B29C 70/003; B29C 70/521; B29C 70/523; B29C 70/526; B29C 70/527;
(Continued)

(56) References Cited

U.S. PATENT DOCUMENTS 5,073,413 A * 12/1991 Koppernaes .......... B29B 15/122
427/294
5,407,616 A * 4/1995 Dube ...................... B29C 70/50
264/137

(Continued)

FOREIGN PATENT DOCUMENTS

CN 111169045 A 5/2020
EP 3124219 A1 2/2017

OTHER PUBLICATIONS

International Search Report for International Patent Application No. PCT/EP2021/074178, mailed Dec. 1, 2021.
Written Opinion for International Patent Application No. PCT/EP2021/072796, mailed Dec. 1, 2021.

*Primary Examiner* — Philip C Tucker
*Assistant Examiner* — Brian R Slawski
(74) *Attorney, Agent, or Firm* — K&L Gates LLP

(57) ABSTRACT

A method and an equipment for preparing a pultruded polyurethane composite by a polyurethane pultrusion process, and the pultruded polyurethane composite obtained by the method and use thereof are provided.

14 Claims, 3 Drawing Sheets

(51) Int. Cl.
  *B29K 75/00* (2006.01)
  *C08G 18/67* (2006.01)
  *C08J 5/24* (2006.01)

(52) U.S. Cl.
  CPC .............. *C08J 5/243* (2021.05); *C08J 5/244* (2021.05); *B29K 2075/00* (2013.01); *C08J 2375/14* (2013.01)

(58) Field of Classification Search
  CPC .. B29C 70/54; B29K 2075/00; C08G 18/672; C08J 2375/14; C08J 5/243; C08J 5/244

USPC .......... 156/60, 166, 180, 181; 264/136, 137, 264/171.13; 425/113, 112, 505, 122
  See application file for complete search history.

(56) References Cited

U.S. PATENT DOCUMENTS

| | | | | |
|---|---|---|---|---|
| 5,492,583 | A * | 2/1996 | Fingerson | B05C 3/12 |
| | | | | 425/114 |
| 5,747,075 | A * | 5/1998 | Gauchel | B29C 70/523 |
| | | | | 156/433 |
| 2003/0006056 | A1* | 1/2003 | Wilemon | H01B 7/182 |
| | | | | 156/48 |
| 2007/0227646 | A1* | 10/2007 | Yano | B29B 15/122 |
| | | | | 156/441 |
| 2014/0367021 | A1* | 12/2014 | Schleiermacher | B29B 15/122 |
| | | | | 156/73.2 |
| 2015/0376946 | A1* | 12/2015 | Kurzer | B29C 65/70 |
| | | | | 156/215 |
| 2016/0160563 | A1 | 6/2016 | Gauchel et al. | |

* cited by examiner

METHOD FOR PREPARING A PULTRUDED POLYURETHANE COMPOSITE

CROSS REFERENCE TO RELATED APPLICATIONS

This application is a U.S. national stage application, filed under 35 U.S.C. § 371, of International Application No. PCT/EP2021/074178, which was filed on Sep. 1, 2021, and which claims priority to European Patent Application No. 20206345.9, which was filed on Nov. 9, 2020, and to Chinese Patent Application No. 202010938117.X, which was filed on Sep. 8, 2020. The contents of each are hereby incorporated by reference into this specification.

TECHNICAL FIELD

The present invention belongs to the field of polyurethane pultrusion technology. Specifically, the present invention relates to a method and an equipment for preparing a pultruded polyurethane composite by a polyurethane pultrusion process, the pultruded polyurethane composite obtained by the method and use thereof.

BACKGROUND

Pultruded composites have received attention in the industry due to the characteristics of high fiber content, uniform quality, and the like. The pultrusion process is widely used because it is simple and efficient, and can achieve continuous production. The general specific operation procedure of the pultrusion process comprising: continuously drawing the fiber yarns or the fiber fabrics from the creel; and conducting resin infiltration by an open dipping tank or a closed infiltration box; placing the fibers, after being infiltrated by the resin, into a mold which maintains a certain cross-sectional shape for heating and curing: then continuously pulling out of the mold by a traction device, and finally being cut in a desired length in-line to obtain the corresponding composites.

Conventional pultrusion is mainly carried out in an open dipping method. In such method, fibers, fabrics or felts pass through a dipping tank with a pressure roller or a pressure rod. After the fibers with the resin are squeezed stepwise by a preforming plate, they are placed in a heated mold and then cured. Conventional open dipping methods have a series of problems such as high VOC (volatile organic compound) volatilization, high resin waste and high porosity content of finished products. In addition, it takes a long time to shut down and change product specifications, and the costs are relatively high.

In addition, the current pultruded polyurethane composites have typically smooth surfaces, which cannot meet the requirements for polyurethane products in which surfaces with certain roughness are necessary so that they can be further processed or jointed.

CN111169045A discloses a dipping device, a mold, an equipment and a method for pultrusion of sheets for girders of wind blades. The dipping device for pultrusion includes a dipping mold comprising a closed first mold cavity and a first heating device arranged outside the first mold cavity, wherein the first mold cavity is provided with an inlet and an outlet and also an injection port passing through the first mold cavity: multiple of injection devices, which have outlets that are connected with the injection port and are suitable for injecting the resin into the first mold cavity. The dipping device, the mold, the equipment and the method for pultrusion of sheets for girders of wind blades can avoid the influence of environmental factors on the performance of the resin. The resin is mixed and used in site, and its concentration is highly uniform. The fiber orientation is precisely controllable. By further controlling the length and temperature of each section of the mold and controlling the content of fibrous materials, good dipping and curing effects are ensured, and the resulting products have better performance.

CN107405842B discloses a pultrusion equipment, which includes a part (3) for receiving fibers, a part (4) for injecting resin among the fibers, a part for impregnating the resin-injected fibers, and a part for shaping the impregnated fibers, wherein after passing through the part for receiving, the fibers gather in the part for injecting resin to receive the resin, and wherein after the resin is injected as the fiber travels through the part for impregnating from the part for injecting, the resin flows outward.

US2005221085A1 discloses a method and a device for preparing polymer-coated or metal-coated fiber composites and hybrid composites. The invention provides for the maximum spraying and coating of a roving of coated fibers with molten polymer streams without making physical contact with a solid media, thus simultaneously preventing the fiber surface from getting damaged and stripping off the coating. When a product made from the composites of the application is used, the electromagnetic shielding properties are improved. The method and apparatus of the document uses sets of nozzle-type sprayers having multiple orifices to enable the thermoplastic or thermoset polymer to penetrate more efficiently into the fiber bundle, thereby providing a more uniform coverage of all fibers. The hybrid composites can consist of two or more types of reinforcements and one or more type of matrix polymers.

Despite the above disclosures, there is an urgent need in the industry for improved processes and corresponding equipment to improve the quality and surfaces of the pultruded polyurethane composites having peel plies, meanwhile improving production efficiency, and adapting to the demand for energy saving, emission reduction, and environmental friendliness.

SUMMARY OF THE INVENTION

One aspect of the present invention is to provide a method for preparing a pultruded polyurethane composite comprising:
- placing at least a peel ply (2) and at least a fibrous reinforcing material (1) in an infiltration box (5) comprising an inlet (5a) and an outlet (5b): wherein the fibrous reinforcing material (1) is partially covered by the peel ply;
- infiltrating the fibrous reinforcing material (1) with a polyurethane composition via the part of the fibrous reinforcing material (1) not covered by the peel ply (2);
- drawing the infiltrated fibrous reinforcing material (1) and the peel ply (2) through a mold (6), and curing to obtain the pultruded polyurethane composite.

The fibrous reinforcing material is not completely, but only partially covered by the peel ply. The polyurethane composition contacts with the fibrous reinforcing material via the part not covered by the peel ply, and infiltrates the fibrous reinforcing material.

DESCRIPTION OF DRAWINGS

The present invention will now be illustrated with reference to the accompanying drawings in which.

DETAILED DESCRIPTION

Figure 1:
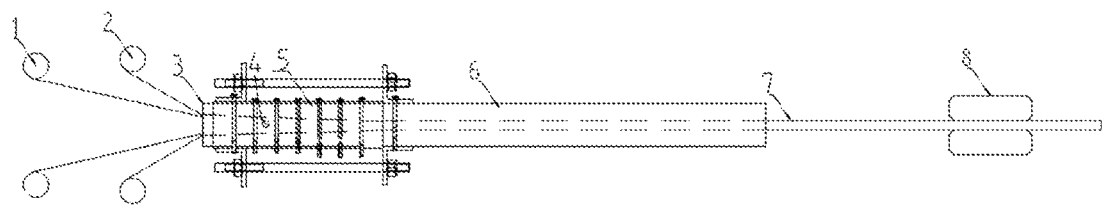
FIG. 1 shows a schematic view of the mold and the scheme in the method for preparing a pultruded polyurethane composite by the pultrusion process according to a preferable embodiment of the present invention, wherein 1 represents the fibrous reinforcing material: 2 represents the peel ply: 3 represents the preforming plate: 4 represents the injection device: 5 represents the infiltration box: 6 represents the mold: 7 represents the profile/the pultruded polyurethane composite; and 8 represents a clamping device.

Preferably, the at least a peel ply (2) comprises two peel plies (2a, 2b), which are located on the two opposite inner sides (5i, 5j) of the infiltration box (5) respectively. The fibrous reinforcing material (1) is located between the two peel plies (2a, 2b). The injection device (4) comprises at least two injection ports (4a, 4b), which are located on the two opposite sides (5m, 5n) of the infiltration box (5), on which no peel ply is placed.

In the method for preparing a pultruded polyurethane composite of the present invention, the peel ply and the fibrous reinforcing material are drawn through the infiltration box at a certain speed by a continuous pultrusion process. The polyurethane composition is injected into the infiltration box by the injection device to infiltrate the fibrous reinforcing material. Preferably, a polyurethane composition is injected via the part of the fibrous reinforcing material (1) not covered by the peel ply, and infiltrates the fibrous reinforcing material (1). The speed at which the infiltrated fibrous reinforcing material and the peel ply are drawn through the mold is of 0.2-2 m/min, preferably 0.2-1.5 m/min. The speed for injecting the polyurethane composition is of 30-2000 g/min, preferably 40-1500 g/min, more preferably 60-1200 g/min. Surprisingly, the method of the present invention characterized by the peel ply, the proper injection ports, the infiltration process, the speed for drawing and the speed for injecting the polyurethane composition provides not only a high-quality pultruded polyurethane composite with satisfactory surfaces, but also shows improved production efficiency and lower costs.

Figure 2:
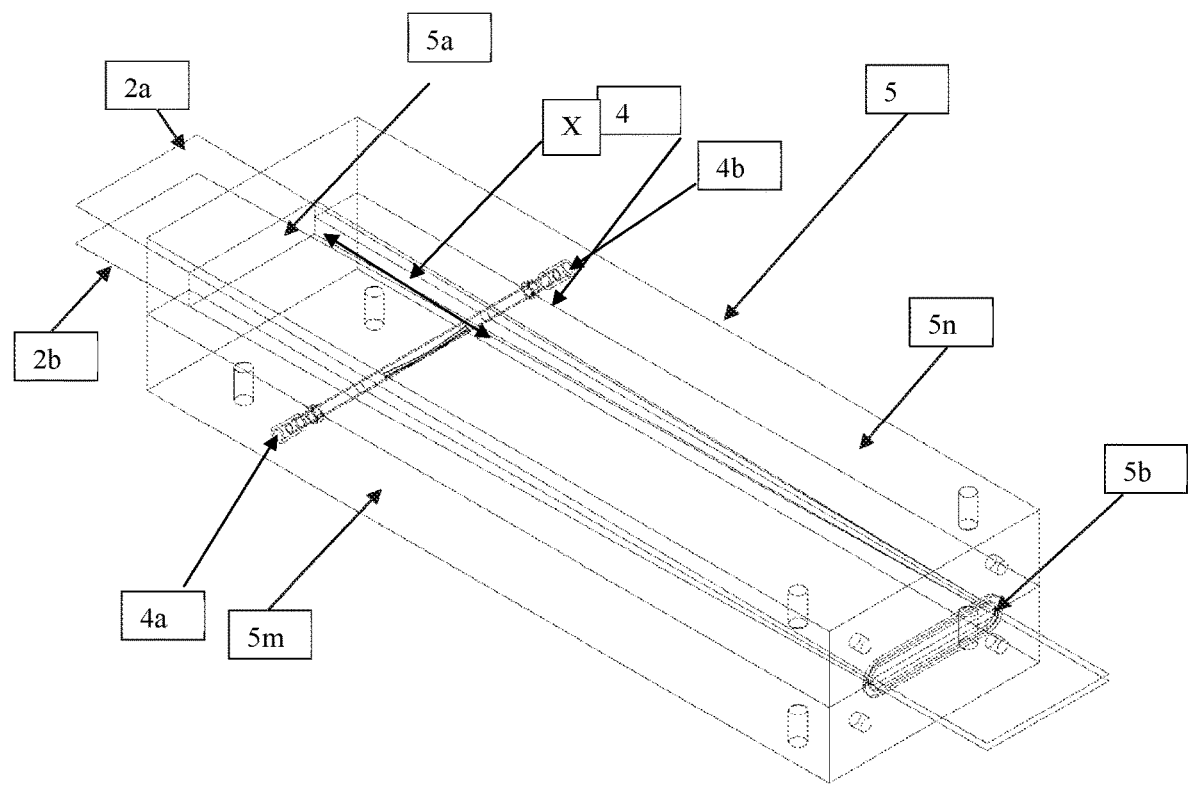
FIG. 2 shows a schematic view of the relative position of the infiltration box and the injection device and the peel plies which are preferable in the present invention, wherein 2a and 2b represent the peel plies (for the sake of simplicity, the fibrous reinforcing material between the two peel plies is not shown): 4 represents the injection device: 4a and 4b represent the injection ports: 5 represents the infiltration box: 5a represents the inlet of the infiltration box: 5b represents the outlet of the infiltration box: 5m and 5n represent the two opposite sides of the infiltration box (5): 4i represents the injection channel; and X represents the distance between the injection device (4) and the inlet (5a) of the infiltration box in the pultrusion direction.

Preferably, the distance between the injection device (4) and the inlet (5a) of the infiltration box in the pultrusion direction is of 20-250 mm, preferably 30-200 mm, more preferably 50-190 mm. As shown in FIG. 2, X represents the distance between the injection device (4) and the inlet (5a) of the infiltration box in the pultrusion direction.

Preferably, the ratio of the cross-sectional area of the inlet (5a) to that of the outlet (5b) of the infiltration box (5) is of 2:1-10:1, more preferably 3:1-8:1. The inlet (5a) refers to the opening through which the fibrous reinforcing material and the peel ply enter the infiltration box in the pultrusion direction, and the outlet (5b) refers to the opening through which the fibrous reinforcing material and the peel ply are pulled out.

Preferably, the gram weight of the peel ply (2a, 2b) is of 40-160 g/m$^2$, preferably 50-150 g/m$^2$, preferably 70 g/m$^2$-120 g/m$^2$.

Preferably, the injection device (4) further comprises at least one injection channel (4i), which communicates with and is fed through two injection ports (4a, 4b).

Preferably, the shape of the injection channel (4i) is selected from circular, elliptical, rectangular, drop-shaped, triangular, trapezoidal, streamlined, fan-shaped, dam-shaped and combinations thereof, preferably circular, elliptical or fan-shaped.

Figure 4:
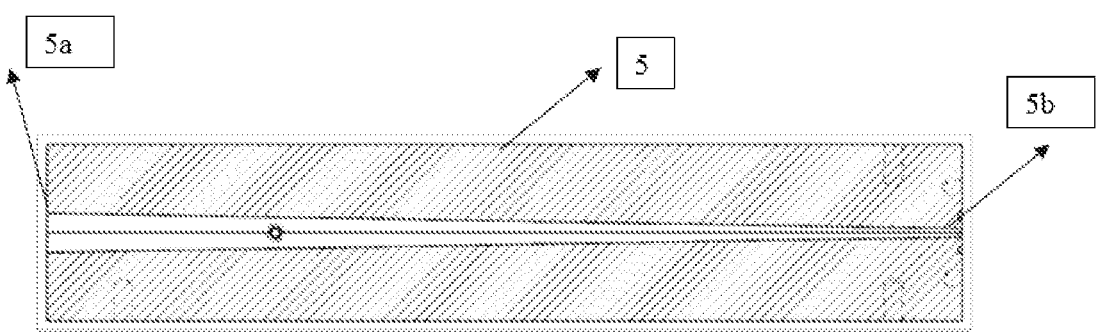
FIG. 4 shows a cross-sectional view of the infiltration box, which is preferable in the present invention, wherein 5 represents the infiltration box, 5a represents the inlet of the infiltration box, and 5b represents the outlet of the infiltration box.
Figure 5:
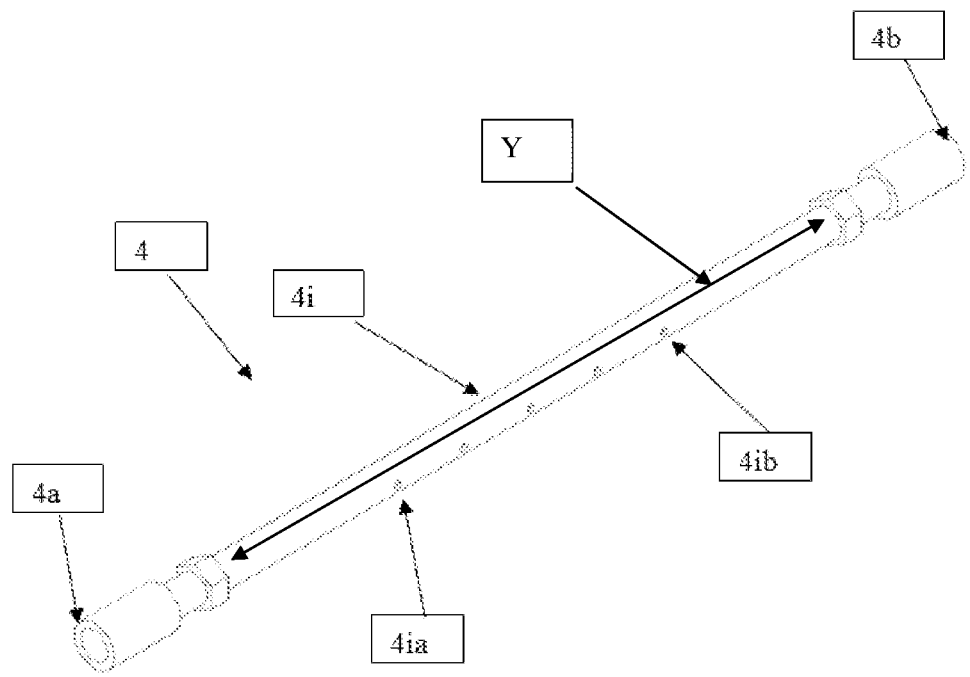
FIG. 5 shows a schematic view of a injection device comprising an injection channel, which is preferable in the present invention, wherein 4 represents the injection device: 4a and 4b represent the injection ports: 4i represents the injection channel: 4ia and 4ib represent the openings on the injection channel, and Y represents the width of the injection channel.
Figure 6:
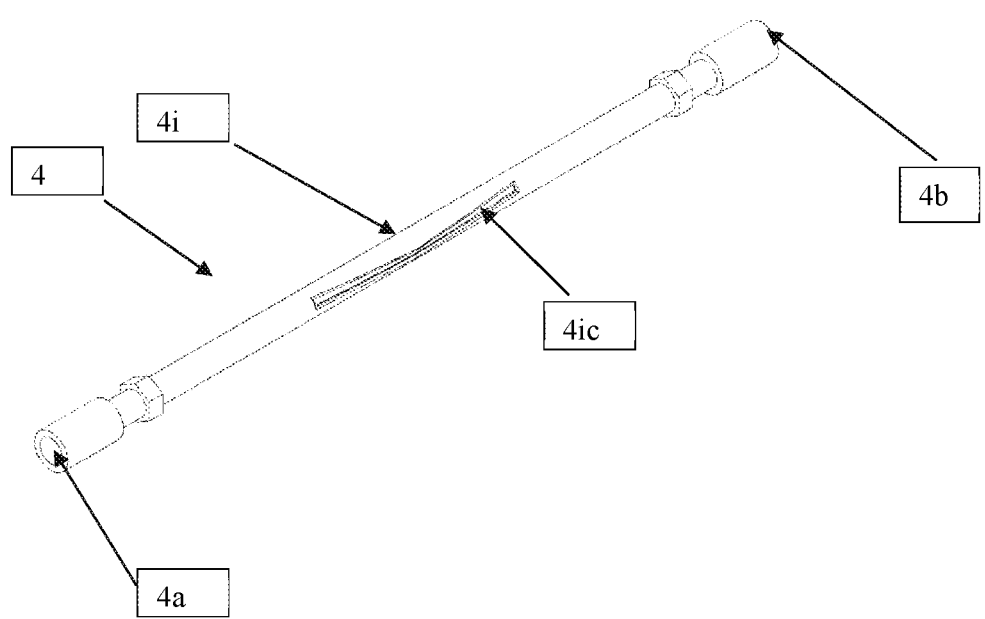
FIG. 6 shows a schematic view of another injection device comprising an injection channel, which is preferable in the present invention, wherein 4 represents the injection device: 4a and 4b represent the injection ports: 4i represents the injection channel; and 4ic represents the slit on the injection channel.

Preferably, the length of the injection channel (4i) is greater than or equal to the width of the infiltration box (4). The width of the injection channel is of 6-30 mm, preferably 8-20 mm. As shown in FIG. 4, Y represents the width of the injection channel.

Preferably, there are at least two openings (4ia, 4ib) and/or at least one slit (4ic) on the injection channel (4i). The diameter of the openings is of 0.5-5 mm, preferably 1-4 mm, more preferably 1.5-3 mm.

Preferably, the center distance of the two farthest openings (4ia, 4ib) among said openings is of 5%-90%, preferably 10%-80%, more preferably 15%-70% of the length of the injection channel (4i).

Preferably, the width of the slit is of 0.5-4 mm, preferably 1-3 mm. The length of the slit (4ic) is 5%-90%, preferably 10%-80%, more preferably 15%-70% of that of the injection channel (4i).

Preferably, the method further comprises mixing the polyurethane composition by using an automatic metering and mixing device.

Preferably, the polyurethane composition comprises the following components:
 a component A, comprising one or more organic polyisocyanates;
 a component B, comprising:
  B1) one or more organic polyols in an amount of 21-60 wt. %, preferably 21-40 wt. %, based on the total weight of the polyurethane composition as 100 wt. %;
  B2) one or more compounds with the structure of formula (I) in an amount of 0-35 wt. %, preferably 4.6-35 wt. %, based on the total weight of the polyurethane composition as 100 wt. %,

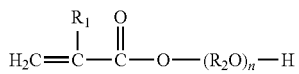

wherein, R1 is selected from hydrogen, methyl or ethyl; R2 is selected from alkylenes having 2-6 carbon atoms, propylene-2,2-di(4-phenylene), 1,4-xylylene, 1,3-xylylene, 1,2-xylylene; and n is an integer selected from 1-6; and a component C, a free radical initiator.

Preferably, the organic polyol has a functionality of 1.7-6, preferably 1.9-4.5, and a hydroxyl value of 150-1100 mg KOH/g, preferably 150-550 mg KOH/g.

Preferably, component B2) is selected from: hydroxyethyl methacrylate, hydroxypropyl methacrylate, hydroxybutyl methacrylate, hydroxyethyl acrylate, hydroxypropyl acrylate, hydroxy butyl acrylate or combinations thereof.

Preferably, the gel time of the polyurethane composition at 25° C. is of 10-40 minutes, preferably 15-30 minutes, more preferably 16-28 minutes.

Preferably, the fibrous reinforcing material (1) is selected from glass fibers, carbon fibers, polyester fibers, natural fibers, aramid fibers, nylon fibers, basalt fibers, boron fibers, silicon carbide fibers, asbestos fibers, metal fibers or combinations thereof.

Preferably, the thickness of the fibrous reinforcing material (1) is >2 mm, preferably >3 mm, more preferably 2-8 mm.

Preferably, the infiltration box (5) is hermetic. The pressure in the infiltration box (5) is preferably of 0.1-15 bar.

Preferably, the infiltration box (5) has an observation window arranged on itself.

Preferably, a yarn guide (3') is arranged in front of or behind the infiltration box (5).

Preferably, a preforming plate (3) is arranged in front of or behind the infiltration box (5).

Preferably, the curing time of the pultruded polyurethane composite at 150-220° C. is of 15-90 seconds, preferably 18-80 seconds.

By means of repeated experiments, unexpectedly, it is found that the method for preparing a pultruded polyurethane composite of the present invention can simply and efficiently prepare pultruded polyurethane composites with satisfactory quality and desired non-smooth or rough surfaces.

Especially for fibrous reinforcing materials with a certain thickness, the method of the present invention can achieve good infiltration and at the same time obtain the pultruded polyurethane composites with satisfactory surface properties.

Another aspect of the present invention is to provide an equipment (10) for use in the method for preparing a pultruded polyurethane composite of the present invention, comprising an injection device (4) and an infiltration box (5). The injection device (4) comprises at least two injection ports (4a, 4b), which are located on two opposite sides (5m, 5n, or 5i, 5j) of the infiltration box (5).

According to the method of the present invention, the polyurethane composition is directly injected onto the fibrous reinforcing material. The injection ports of the present invention should be close to the part of the fibrous reinforcing material not covered by the peel ply, rather than the part of the fibrous reinforcing material covered by the peel ply. In this way, it is ensured that the polyurethane composition is directly injected onto the fibrous reinforcing material, rather than being immersed among the fibrous reinforcing material via the peel ply.

Preferably, the infiltration box (5) is cuboid. The injection ports (4a, 4b) are located on two sides (5m, 5n) of the infiltration box perpendicular to the horizontal plane.

Preferably, the injection device (4) further comprises at least two injection pipes (4k, 4g), which are placed into the infiltration box (5) via the injection ports (4a, 4b).

Preferably, the injection device (4) further comprises at least one injection channel (4i), which communicates with and is fed through the injection ports (4a, 4b).

Preferably, the shape of the injection channel (4i) is selected from circular, elliptical, rectangular, drop-shaped, triangular, trapezoidal, streamlined, fan-shaped, dam-shaped and combinations thereof, preferably circular, elliptical or fan-shaped.

Preferably, the length of the injection channel (4i) is greater than or equal to the width of the infiltration box. The width of the injection channel is of 6-30 mm, preferably 8-20 mm.

Preferably, there are at least two openings (4ia, 4ib) and/or at least one slit (4ic) on the injection channel (4i). The diameter of the openings is of 0.5-5 mm, preferably 1-4 mm, more preferably 1.5-3 mm.

Preferably, the center distance of the two farthest openings (4ia, 4ib) among said openings is of 5%-90%, preferably 10%-80%, more preferably 15%-70% of the length of the injection channel (4i).

Preferably, the width of the slit is of 0.5-4 mm, preferably 1-3 mm. The length of the slit (4ic) is 5%-90%, preferably 10%-80%, more preferably 15%-70% of that of the injection channel (4i).

Preferably, the distance between the injection device (4) and the inlet of the infiltration box (5) is of 20-250 mm, preferably 30-200 mm, more preferably 50-190 mm.

Preferably, the ratio of the cross-sectional area of the inlet (5a) to that of the outlet (5b) of the infiltration box is of 2:1-10:1, more preferably 3:1-8:1.

Preferably, the shape of the injection channel (4i) is selected from circular, elliptical, rectangular, drop-shaped, triangular, trapezoidal, streamlined, fan-shaped, dam-shaped and combinations thereof. The length of the injection channel (4i) is greater than or equal to the width of the infiltration box (5). The width of the injection channel (4i) is of 6-30 mm, preferably 8-20 mm.

By using the equipment comprising an injection device and an infiltration box of the present invention, the fibrous reinforcing material can be infiltrated well in the presence of a peel ply, thereby providing a high-quality pultruded polyurethane composite with uniform resin distribution and good curing. Particularly unexpectedly, due to the injection device and the infiltration box with special structures (such as the injection ports and the injection channel) of the present invention, as well as their corresponding positions and connections and/or the corresponding processes, the effect and efficiency of infiltration can be improved greatly, thereby not only providing a pultruded polyurethane composite with desired surfaces, and also improving production efficiency, saving raw materials and reducing costs.

Another aspect of the present invention is to provide a pultruded polyurethane composite, which is prepared by the method for preparing a pultruded polyurethane composite of the present invention as described above.

Still another aspect of the present invention is to provide a polyurethane product comprising the polyurethane composite prepared by the method for preparing a pultruded polyurethane composite of the present invention as described above.

Preferably, the polyurethane product is selected from cable trays, curtain wall frames of doors and windows, ladder frames, tent poles or pipes, anti-glare boards, floors, sucker rods, telegraph poles and cross arms, guardrails, grilles, profiles for buildings, profiles and plates for containers, bicycle racks, fishing poles, cable cores, insulator core rods, radomes, single-layer or sandwich continuous plates or sheets for manufacturing girders of turbine blades.

By means of repeated experiments, unexpectedly, it is found that the method for preparing a pultruded polyurethane composite of the present invention characterized by the peel ply, the fibrous reinforcing material, the injection device and the infiltration box, as well as their mutual positional relationship, and the area ratio of the inlet and the outlet of the infiltration box etc., can simply and efficiently prepare pultruded polyurethane composites with satisfactory quality and desired non-smooth or rough surfaces. By using the equipment comprising a injection device and a infiltration box of the present invention, the fibrous reinforcing material can be infiltrated well in the presence of a peel ply, thereby providing a high-quality pultruded polyurethane composite with uniform resin distribution and good curing.

By the method for preparing a polyurethane composite of the present invention by a polyurethane pultrusion process, in which the polyurethane composition as described above is used and the injection device and the infiltration box are ingeniously designed for the composition, the surfaces of the polyurethane pultrusion composite are improved, and production efficiency is improved and costs are reduced.

In addition, the polyurethane composition of the present invention has a longer gel time and thus better pultrusion of the polyurethane can be achieved. The polyurethane composite of the present invention has excellent physical properties and high glass fiber content.

Moreover, the polyurethane composition of the present invention has a shorter curing time and a longer gel time, so that it is better and more flexible (for example in terms of infiltration and molding for a longer time) to be used for preparing pultruded polyurethane composites, especially of large-scaled pultruded polyurethane composites, such as profiles for girders of wind blades. Specifically, the fibrous reinforcing material can be better infiltrated and molded for a longer time at room temperature, for example, before entering the mold, and can be cured faster at high temperature, for example, after entering the mold.

EMBODIMENTS

The specific embodiments of the present invention will be described below.

The method for preparing a pultruded polyurethane composite of the present invention comprises:
placing at least a peel ply (2) and at least a fibrous reinforcing material (1) in an infiltration box (5) comprising an inlet (5a) and an outlet (5b): wherein the fibrous reinforcing material (1) is partially covered by the peel ply;
infiltrating the fibrous reinforcing material (1) with a polyurethane composition via the part of the fibrous reinforcing material (1) not covered by the peel ply (2);
drawing the infiltrated fibrous reinforcing material (1) and the peel ply (2) through a mold (6), and
curing to obtain the pultruded polyurethane composite.

Preferably, the at least a peel ply (2) comprises two peel plies (2a, 2b), which are placed on two opposite inner sides (5i, 5j) of the infiltration box (5) respectively. The fibrous reinforcing material (1) is located between two peel plies (2a, 2b). The injection device (4) comprises at least two injection ports (4a, 4b), which are located on two opposite sides (5m, 5n) of the infiltration box (5), on which no peel ply is placed.

Preferably, the injection ports (4a, 4b) are located on the sides of the infiltration box without peel ply (2), that is, on the sides far away from or not close to the peel ply (2). No injection port is arranged on the side of the infiltration box, which has a peel ply placed on it or is close to the peel ply.

Preferably, the polyurethane composition comprises the following components:
a component A, comprising one or more organic polyisocyanates;
a component B, comprising:
B1) one or more organic polyols in an amount of 21-60 wt. %, preferably 21-40 wt. %, based on the total weight of the polyurethane composition as 100 wt. %;
B2) one or more compounds with the structure of formula (I) in an amount of 0-35 wt. %, preferably 4.6-35 wt. %, based on the total weight of the polyurethane composition as 100 wt. %,

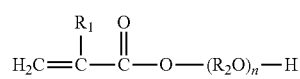

I wherein, R1 is selected from hydrogen, methyl or ethyl: R2 is selected from alkylenes having 2-6 carbon atoms, propylene-2,2-di(4-phenylene), 1,4-xylylene, 1,3-xylylene, 1,2-xylylene; and n is an integer selected from 1-6; and
a component C, a free radical initiator.

According to the present invention, there is no limitation on the shape and size of the fibrous reinforcing material. For example, it may be continuous fibers, fiber webs formed by bonding, or fiber fabrics.

In some embodiments of the present invention, the fibrous reinforcing material is selected from glass fibers, carbon fibers, polyester fibers, natural fibers, aramid fibers, nylon fibers, basalt fibers, boron fibers, silicon carbide fibers, asbestos fibers, whiskers, metal fibers or combinations thereof.

Optionally, the organic polyisocyanate can be any aliphatic, cycloaliphatic or aromatic isocyanate known to be used in the preparation of polyurethanes. Examples include, but are not limited to, toluene diisocyanate (TDI), diphenylmethane diisocyanate (MDI), polyphenylene polymethylene polyisocyanate (pMDI), 1,5-naphthalene diisocyanate (NDI), hexamethylene diisocyanate (HDI), methylcyclohexyl diisocyanate (TDI), 4,4'-dicyclohexylmethane diisocyanate, isophorone diisocyanate (IPDI), p-phenylene diisocyanate (PPDI), p-xylylene diisocyanate (XDI), tetramethylxylylene diisocyanate (TMXDI) and their polymers or combinations thereof. The functionality of the isocyanate usable for the present invention is preferably of 2.0-3.5, particularly preferably 2.1-2.9. The viscosity of the isocyanate usable for the present invention is preferably of 5-700 mPa·s, particularly preferably 10-300 mPa·s, measured at 25° C., according to DIN 53019 Jan. 3.

According to the present invention, the organic polyisocyanates include isocyanate dimers, trimers, tetramers, pentamers, or combinations thereof.

In a preferable embodiment of the present invention, the isocyanate of the component A is selected from diphenylmethane diisocyanate (MDI), polyphenylene polymethylene polyisocyanate (pMDI), and their polymers, prepolymers or combinations thereof.

A blocked isocyanate can also be used as the isocyanate of the component A. It can be prepared by reacting excess of an organic polyisocyanate or a mixture thereof with a polyol compound. Those skilled in the art are familiar with these compounds and their preparation methods.

The polyurethane composition of the present invention comprises one or more organic polyols B1). The amount of the organic polyol is of 21-60 wt. %, based on the total weight of the polyurethane composition as 100 wt. %. The organic polyol may be an organic polyol commonly used for preparing polyurethanes in the art, including but not limited to, polyether polyols, polyether carbonate polyols, polyester polyols, polycarbonate diols, polymer polyols, vegetable oil-based polyols or combinations thereof.

The polyether polyol can be prepared by a known process, for example, by reacting an olefin oxide with a starter in the presence of a catalyst. The catalyst is preferably, but not limited to, a basic hydroxide, a basic alkoxide, antimony pentachloride, boron fluoride etherate, or a mixture thereof. The olefin oxide is preferably, but not limited to, tetrahydrofuran, ethylene oxide, propylene oxide, 1.2-butylene oxide, 2.3-butylene oxide, styrene oxide, or a mixture thereof, particularly preferably ethylene oxide and/or propylene oxide. The starter is preferably, but not limited to, a polyhydroxy compound or a polyamine compound. The polyhydroxy compound is preferably, but not limited to, water, ethylene glycol, 1.2-propylene glycol, 1.3-propylene glycol, diethylene glycol, trimethylolpropane, glycerol, bisphenol A, bisphenol S or a mixture thereof. The polyamine compound is preferably, but not limited to, ethylene diamine, propylene diamine, butylene diamine, hexamethylene diamine, diethylene triamine, toluenediamine or a mixture thereof.

Polyether carbonate polyols may also be used in the present invention. The polyether carbonate polyol can be prepared by adding carbon dioxide and an alkylene oxide on a starter containing active hydrogen by using a double metal cyanide catalyst.

The polyester polyol is prepared by reacting a dicarboxylic acid or a dicarboxylic acid anhydride with a polyol. The dicarboxylic acid is preferably, but not limited to, aliphatic carboxylic acids containing 2-12 carbon atoms, which is preferably, but not limited to, succinic acid, malonic acid, glutaric acid, adipic acid, suberic acid, azelaic acid, sebacic acid, dodecanedioic acid, maleic acid, fumaric acid, phthalic acid, isophthalic acid, terephthalic acid, or a mixture thereof. The dicarboxylic acid anhydride is preferably, but not limited to, phthalic anhydride, tetrachlorophthalic anhydride, maleic anhydride, or a mixture thereof. The polyol reacted with the dicarboxylic acid or the dicarboxylic acid anhydride is preferably, but not limited to, ethylene glycol, diethylene glycol, 1.2-propylene glycol, 1.3-propylene glycol, dipropylene glycol, 1.3-methyl propylene glycol, 1.4-butanediol, 1.5-pentanediol, 1.6-hexanediol, neopentyl glycol, 1.10-decanediol, glycerol, trimethylolpropane, or a mixture thereof. The polyester polyol also includes polyester polyols prepared from lactones. The polyester polyol prepared from lactones is preferably, but not limited to, poly-ε-caprolactone. Preferably, the polyester polyol has a molecular weight of 200-3000, and a functionality of 2-6, preferably 2-5, more preferably 2-4.

The polycarbonate diol can be prepared by reacting a diol with a dihydrocarbyl carbonate or diaryl carbonate or phosgene. The diol is preferably, but not limited to 1.2-propylene glycol, 1.3-propylene glycol, 1.4-butanediol, 1.5-pentanediol, 1.6-hexanediol, diethylene glycol, trioxanediol, or a mixture thereof. The dihydrocarbyl carbonate or diaryl carbonate is preferably, but not limited to, diphenyl carbonate.

The polymer polyol may be a polymer-modified polyether polyol, preferably a grafted polyether polyol, and a polyether polyol dispersion. The grafted polyether polyol is preferably a grafted polyether polyol based on styrene and/or acrylonitrile. The styrene and/or acrylonitrile can be prepared by in-situ polymerization of styrene, acrylonitrile, or a mixture of styrene and acrylonitrile. In the mixture of styrene and acrylonitrile, the ratio of styrene to acrylonitrile is of 90:10-10:90, preferably 70:30-30:70. The polymer polyol of the present invention can also be a bio-based polyol, such as castor oil and wood tar. The polymer polyether polyol dispersion comprises a dispersed phase, for example, inorganic fillers, polyureas, polyhydrazides, and polyurethanes containing bonded tertiary amino groups and/or melamine. The dispersed phase is present in an amount of 1-50 wt. %, preferably 1-45 wt. %, based on the weight of the polymer polyether polyol as 100 wt. %. Preferably, the polymer solid is present in the polymer polyether polyol in an amount of 20%-45%, based on the weight of the polymer polyether as 100 wt. %, and has a hydroxyl value of 20-50 mg KOH/g.

According to the present invention, the vegetable oil-based polyol includes vegetable oils, vegetable oil polyols or modified products thereof. The vegetable oil is a compound prepared from unsaturated fatty acids and glycerol, or fat or oil extracted from plant fruits, seeds, and germs, which is preferably, but not limited to, peanut oil, soybean oil, linseed oil, castor oil, rapeseed oil, and palm oil. The vegetable oil polyol is a polyol starting from one or more vegetable oils. The starter for the synthesis of vegetable oil polyols includes, but is not limited to, soybean oil, palm oil, peanut oil, canola oil, and castor oil. Hydroxyl groups can be introduced into the starter for the vegetable oil polyol via a process such as cracking, oxidation or transesterification, and then the corresponding vegetable oil polyol can be prepared by a process for preparing organic polyols well known to those skilled in the art.

Methods for measuring the hydroxyl value are well known to those skilled in the art and are disclosed, for example, in Houben Weyl, Methoden der Organischen Chemie, vol. XIV/2 Makromolekulare Stoffe, p. 17, Georg Thieme Verlag: Stuttgart 1963. The entire contents of this document are incorporated herein by reference.

As used herein, the functionality and hydroxyl value of organic polyols refer to average functionality and average hydroxyl value respectively, unless otherwise indicated.

Optionally, the polyurethane composition of the present invention further comprises one or more compounds B2) having the structure of formula (I)

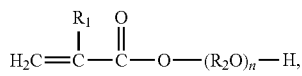

wherein, $R_1$ is selected from hydrogen, methyl or ethyl: $R_2$ is selected from alkylene groups having 2-6 carbon atoms; and n is an integer selected from 1-6.

In a preferable embodiment of the present invention, $R_2$ is selected from ethylene, propylene, butylene, pentylene, 1-methyl-1,2-ethylene, 2-methyl-1,2-ethylene, 1-ethyl-1,2-ethylene, 2-ethyl-1,2-ethylene, 1-methyl-1,3-propylene, 2-methyl-1,3-propylene, 3-methyl-1,3-propylene, 1-ethyl-1,3-propy lene, 2-ethyl-1,3-propylene, 3-ethyl-1,3-propylene, 1-methyl-1,4-buty lene, 2-methyl-1,4-butylene, 3-methyl-1,4-butylene and 4-methyl-1,4-butylene, propylene-2,2-di(4-phenylene), 1,4-xyly lene, 1,3-xylylene, 1,2-xylylene.

Preferably, B1) is selected from organic polyol having a functionality of 1.7-6, preferably 1.9-4.5, and a hydroxyl value of 150-1100 mg KOH/g, preferably 150-550 mg KOH/g.

In a preferable embodiment of the present invention, the component B2) is selected from hydroxyethyl methacrylate, hydroxypropyl methacrylate, hydroxy butyl methacrylate, hydroxyethyl acrylate, hydroxypropyl acrylate, hydroxy butylacrylate or combinations thereof.

The compound of formula (I) can be prepared by a method generally used in the art, for example, by esterification reaction of (meth)acrylic anhydride or (meth)acrylic acid, (meth)acryloyl halide with HO—$(R_2O)_n$—H. The preparation method is well known to those skilled in the art, for example, disclosed in "Handbook of Polyurethane Raw Materials and Auxiliaries" (Yijun Liu, published on Apr. 1, 2005). Chapter 3; and "Polyurethane Elastomers" (Houjun Liu, published in August 2012). Chapter 2. The entire contents of these documents are incorporated herein by reference.

Preferably, the polyurethane composition of the present invention further comprises a component C, a free radical initiator. The free radical initiator used in the present invention can be added to the polyol component or the isocyanate component or both components. The initiator includes, but is not limited to, peroxides, persulfides, peroxycarbonates, peroxyboric acid, azo compounds, or other suitable free radical initiators which can initiate the curing of double bond-containing compounds, examples of which include tert-butyl peroxy isopropyl carbonate, tert-butyl peroxy-3.5.5-trimethylhexanoate, methyl ethyl ketone peroxide, and cumene hydroperoxide. Preferably, the free radical initiator of the present invention is present in an amount of 0.1-8 wt. %, based on the total weight of the polyurethane composition of the present invention as 100 wt. %. In addition, an accelerator such as a cobalt compound or an amine compound may also be present.

Optionally, the polyurethane composition may further comprise a catalyst for catalyzing the reaction of isocyanate groups (NCO) with hydroxyl groups (OH). Suitable catalysts for polyurethane reaction are preferably, but not limited to, amine catalysts, organometallic catalysts, or mixtures thereof. The amine catalyst is preferably, but not limited to, triethylamine, tributylamine, triethylenediamine. N-ethylmorpholine, N,N,N',N'-tetramethyl-ethylenediamine, pentamethyldiethylene-triamine, N-methylaniline, N,N-dimethylaniline, or a mixture thereof. The organometallic catalyst is preferably, but not limited to, an organotin compounds, such as tin (II) acetate, tin (II) octoate, tin ethylhexanoate, tin laurate, dibutyl tin oxide, dibutyl tin dichloride, dibutyl tin diacetate, dibutyl tin maleate, dioctyl tin diacetate, or a mixture thereof. Preferably, the catalyst is present in an amount of 0.001-10 wt. %, based on the total weight of the polyurethane composition of the present invention as 100 wt. %.

In an embodiment of the present invention, in the polyaddition reaction of isocyanate groups and hydroxyl groups, the isocyanate groups may be those contained in the organic polyisocyanate (component A), or may also be those contained in the reaction intermediate of the organic polyisocyanate (component A) with the organic polyol (component B1)) or the component B2). The hydroxyl group may be those contained in the organic polyol (component B1)) or the component B2), or may also be those contained in the reaction intermediate of the organic polyisocyanate (component A) with the organic polyol (component B1)) or the component B2).

In an embodiment of the present invention, the radical polymerization reaction is a polyaddition reaction of ethylenic bonds, wherein the ethylenic bonds may be those contained in the component B2), or may also be those contained in the reaction intermediate of the component B2) with the organic polyisocyanate.

In an embodiment of the present invention, the polyaddition reaction (i.e., the polyaddition reaction of isocyanate groups with hydroxyl groups) for polyurethanes is carried out simultaneously with the radical polymerization reaction. It is well known to those skilled in the art that suitable reaction conditions can be selected, such that the polyurethane polyaddition reaction and the radical polymerization reaction are carried out in succession. However, the polyurethane matrix thus obtained has a different structure from that of a polyurethane matrix obtained by simultaneous polyaddition reaction and radical polymerization reaction. Thus, the mechanical properties and processability of the prepared polyurethane composites are different.

Optionally, the polyurethane composition as described above may further comprise auxiliary agents or additives, which include, but are not limited to, fillers, internal release agents, flame retardants, smoke suppressants, dyes, pigments, antistatic agents, antioxidants. UV stabilizers, diluents, defoaming agents, coupling agents, surface wetting agents, leveling agents, water scavengers, catalysts, molecular sieves, thixotropic agents, plasticizers, foaming agents, foam stabilizers, foam homogenizing agents, free radical reaction inhibitors or combinations thereof. These ingredients may optionally be contained in the isocyanate component A) and/or the polyurethane composition B) of the present invention. These ingredients may also be stored separately as a component D), which is firstly mixed with the isocyanate component A) and/or the polyurethane composition B) of the present invention and then used for preparing the polyurethane composites.

The internal release agent that can be used in the present invention includes any conventional release agent used in the production of polyurethanes. Examples thereof include long-chain carboxylic acids, especially fatty acids, such as stearic acid, and amines of long-chain carboxylic acids, such as stearamide, fatty acid esters, metal salts of long-chain carboxylic acids, such as zinc stearate, or polysiloxanes.

Examples of the flame retardant that can be used in the present invention include triaryl phosphates, trialkyl phosphates, halogen-bearing triaryl phosphates or trialkyl phosphates, melamine, melamine resins, halogenated paraffin, red phosphorus or combinations thereof.

Other additives that can be used in the present invention include water scavengers, such as molecular sieves: defoamers, such as polydimethylsiloxane: coupling agents, such as monoethylene oxide, or organoamine-functionalized trialkoxysilanes or combinations thereof. The coupling agent is particularly preferably used to improve the adhesion between the resin matrix and the fibrous reinforcing material. Fine-particle fillers, such as clay and fumed silica, are often used as thixotropic agents.

Free radical reaction inhibitors that can be used in the present invention include polymerization inhibitors and retarders, such as phenols, quinones or hindered amines, examples of which include methylhydroquinone, p-methoxyphenol, benzoquinone, polymethylpyridine derivatives, low-valent copper ions, etc.

Generally, the term "gel time" refers to the time from when the component A and B of the reaction system start mixing until the viscosity reaches a certain value (for example, about 10000 mPa·s). The gel time mentioned in the examples of the present invention is that measured using a gel tester.

By means of repeated experiments, unexpectedly, it is found that the method for preparing a pultruded polyurethane composite of the present invention may simply and efficiently provide a pultruded polyurethane composite with satisfactory quality and desired rough surfaces. By using the injection device and the infiltration box which are specially designed to be suitable for the method of the present invention, the fibrous reinforcing material, especially the fiber reinforcing material with a certain thickness, can be infiltrated better in a shorter time.

In addition, the polyurethane composition of the present invention has a shorter curing time and a longer gel time, so that it is better and more flexible (for example in terms of infiltration and molding for a longer time) to be used for preparing pultruded polyurethane composites, especially of large-scaled pultruded polyurethane composites. Specifically, the fibrous reinforcing material can be better infiltrated and molded for a longer time at room temperature, for example, before entering the mold, and can be cured faster at high temperature, for example, after entering the mold.

The equipment (10) of the present invention for use in the method for preparing a pultruded polyurethane composite of the present invention comprises an injection device (4) and an infiltration box (5). The injection device (4) comprises at least two injection ports (4a, 4b), which are located on two opposite sides (5m, 5n, or 5i, 5j) of the infiltration box (5).

Preferably, the infiltration box (5) is cuboid. The injection ports (4a, 4b) are located on two sides (5m, 5n) of the infiltration box perpendicular to the horizontal plane.

Figure 3:
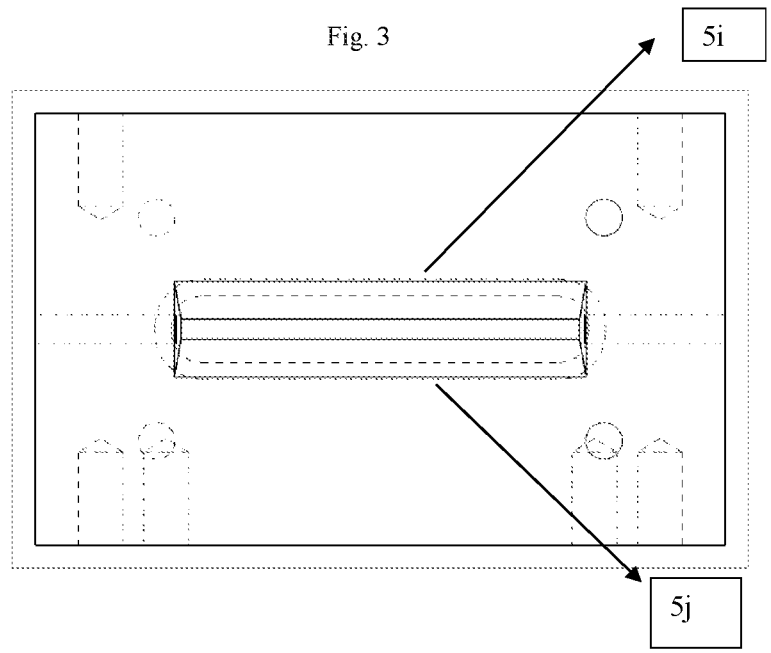
FIG. 3 shows a front view of the infiltration box, which is preferable in the present invention, wherein 5i and 5j represent the upper and lower sides of the infiltration box, respectively.

Unexpectedly, it is found that when the injection ports are located on the sides of the infiltration box close to the peel ply (e.g. 5i, 5j in FIG. 3), the polyurethane composition contacts firstly with the peel ply upon injection and then with the fibrous reinforcing material via the peel ply, resulting in a poor infiltration effect. When the injection ports are located on the sides of the infiltration box without the peel ply, not close to or far away from the peel ply (e.g., 5m, 5n in FIG. 2), a better infiltration effect can be achieved. There is no need to arrange an injection port on the sides of the infiltration box with or close to the peel ply. Preferably, the infiltration box have two surfaces with larger area parallel to the horizontal plane, and four surfaces with smaller area perpendicular to the horizontal plane. Since the inlet and outlet are required to allow the fibrous reinforcing material and the peel ply to be drawn through, it is not suitable to arrange injection ports on the sides having the inlet and the outlet. Therefore, preferably, at least two injection ports are arranged respectively on the two sides of the infiltration box perpendicular to the horizontal plane and also perpendicular to the planes where the inlet and the outlet of the infiltration box are located.

Preferably, the injection device (4) further comprises at least two injection pipes (4k, 4g), which are placed in the infiltration box (5) via the injection ports (4a, 4b).

Preferably, the injection device (4) further comprises at least one injection channel (4i), which communicates with and is fed through the injection ports (4a, 4b).

Preferably, the shape of the injection channel (4i) is selected from circular, elliptical, rectangular, drop-shaped, triangular, trapezoidal, streamlined, fan-shaped, dam-shaped and combinations thereof, preferably circular, elliptical or fan-shaped.

Preferably, the length of the injection channel (4i) is greater than or equal to the width of the infiltration box (5). The width of the injection channel (4i) is of 6-30 mm, preferably 8-20 mm.

Preferably, there are at least two openings (4ia, 4ib) or at least one slit (4ic) on the injection channel (4i). The diameter of the openings is of 0.5-5 mm, preferably 1-4 mm, more preferably 1.5-3 mm. The size and number of the openings on the injection channel can be adjusted according to the size of the pultruded polyurethane composite to be prepared or of the infiltration box. The number of the openings may be more than 2, preferably 2-5. Similarly, the size and number of slits on the injection channel may also be adjusted according to the size of the pultruded polyurethane composite to be prepared or of the infiltration box. The number of the slits may be more than one, preferably 2-4.

Preferably, the center distance of the two farthest openings (4ia, 4ib) among said openings is of 5%-90%, preferably 10%-80%, more preferably 15%-70% of the length of the injection channel (4i).

Preferably, the width of the slit is of 0.5-4 mm, preferably 1-3 mm, and the length of the slit (4ic) is 5%-90%, preferably 10%-80%, more preferably 15%-70% of that of the injection channel (4i).

Unless defined otherwise, all technical and scientific terms used herein have the same meaning as they are generally understood by those skilled in the art of the present invention. When definitions of the terms in this specification conflict with the meanings generally understood by those skilled in the art of the present invention, the definitions described herein shall apply.

The present invention is described below using the examples by way of illustration, but it should be understood that the scope of the present invention is not limited by these examples.

EXAMPLES

Description of tested performance parameters in the examples of the present application: Functionality refers to a value determined according to the formula in the industry: functionality=hydroxyl value*molecular weight/56100; wherein the molecular weight is determined by GPC high performance liquid chromatography:

Isocyanate index refers to a value calculated by the following formula:

$$\text{isocyanate index}(\%) = \frac{\text{Moles of isocyanate groups (NCO groups) in component } A}{\text{Moles of groups reactive toward isocyanate groups in component } B} \times 100\%$$

NCO content refers to the content of NCO groups in the system, measured according to GB/T 12009.4-2016.

Pultrusion rate/speed, the speed at which the fibrous reinforcing material is drawn through the mold, refers to the length of the pultruded fibrous reinforcing material passing through the mold per minute, that is, the length of the pultruded product produced per minute. In the test, the length of the pultruded fibrous reinforcing material is measured by a speed sensor or a stopwatch and a ruler, and is then divided by the time used, resulting in the length passing through the mold in per time unit, that is, the pultrusion rate/speed.

Curing time refers to the time from when the component A and B of the reaction system are mixed until the mixture is cured.

Gel time refers to the time from when the component A and B of the reaction system start mixing until the viscosity reaches a certain value (for example, about 10000 mPa·s). The gel time of the present invention is tested using a gel tester. In the test, component A and B are mixed evenly, and then placed in the gel tester. The time from pressing the start button until the gel tester stops working is recorded as the gel time. Gel time of this invention is tested by a gel tester GT-STHP-220 from Shanghai Sen Lan Scientific Instrument Co. Ltd.

Source and Description of Raw Materials

TABLE 1

List of raw materials

| Name of raw materials/equipment | Specification/type | Supplier |
| --- | --- | --- |
| Isocyanate | Desmodur 58IF07C | Covestro Polymers (China) Co., Ltd. |
| Polyol component 1 | Baydur 18BD228 | Covestro Polymers (China) Co., Ltd. |
| Polyol component 2 | Baydur 18BD230 | Covestro Polymers (China) Co., Ltd. |
| Glass fiber | PS 4100-2400Tex | Owens Corning Composites (China) Co., Ltd. |
| Carbon fiber | TRW 40/50 L. A3750 tex | Mitsubishi Pyrofil TOW |
| Pultrusion equipment | Crawler pultrusion machine | Nanjing Nuoertai Composite Material Equipment Company |
| Injection machine | Hydraulic Mini Link System | Magnum Venus Products |
| Peel ply | Nylon 66 peel ply 105 g/m$^2$ | Nanfang Chemical Fiber Co., Ltd |

Example 1

The production of the glass fiber-reinforced pultruded polyurethane profile/sheet with peel ply is described by taking the production of a 3 mm*100 mm flat plate as an example. In this example, the ratio of the cross-sectional area of the inlet to that of the outlet of the infiltration box was 7:1; the distance between the injection device (4) and the inlet (5a) of the infiltration box in the pultrusion direction was 50 mm; the width of the injection channel was 10 mm; the diameter of the openings was 2 mm: the length of the channel was 200 mm, and the length of the slit was 50 mm.

Firstly, the injection device (4), the infiltration box (5) and the mold (6) were assembled and fixed on the pultrusion platform. 220 bundles of glass fibers (1) were pulled out from the creel. Simultaneously, two peel plies (2a, 2b) were pulled out from the creel and then passed through the guide/preforming plate (3), the infiltration box (5) and the mold (6) together with the glass fibers (1). Thereafter, they were drawn forward by the traction device until the glass fibers were all drawn smoothly. The peel ply 2a was close to the upper side (5i) of the infiltration box (5), while the peel ply 2b was close to the lower side (5j) of the infiltration box. The heating device of the mold (6) was turned on. The mold temperature from the inlet to the outlet was controlled as follows: 80° C./180° C./190° C. Upon the temperature being stable, the injection machine was turned on. The isocyanate component and polyol component B (100 parts of polyol component 1:4 parts of polyol component 2) were continuously pumped to the static mixing head at a weight ratio of 100:130. After being mixed by the mixing head, the resin was injected into the injection channel via the injection ports (4a, 4b) on both sides (5m, 5n) of the infiltration box (5). The resin was evenly injected into the infiltration box via multiple openings on the injection channel, and filled the infiltration box completely (average injection speed of 110 g/min). Thus, the glass fibers (1) and the peel plies (2) were fully immersed. The injection pressure in the infiltration box (5) was controlled at 0.1-15 bar.

The glass fibers (1) and the peel plies (2a, 2b) immersed in the infiltration box (5) were continuously drawn through the mold (6) by the traction device 8 at a speed of 0.5 m/min. After being pulled out from the mold, the plate was smooth and without dry yarns. When the resulting pultruded polyurethane composite/profile was knocked with a metal part at a distance of 1 meter away from the mold, it sounded clear, which indicates that the infiltration and curing was good.

Before the further processing of the resulting pultruded polyurethane composite/profile, the peel plies should be removed, so that a pultruded polyurethane composite/profile with the desired surfaces can be obtained.

Example 2

The production of the carbon fiber-reinforced pultruded polyurethane sheet with peel ply is described by taking the production of a 3 mm*100 mm flat plate as an example. In this example, the ratio of the cross-sectional area of the inlet to that of the outlet of the infiltration box was 7:1: the distance between the injection device (4) and the inlet (5a) of the infiltration box in the pultrusion direction was 50 mm: the width of the injection channel was 10 mm: the diameter of the openings was 2 mm: the length of the channel was 200 mm, and the length of the slit was 50 mm.

Firstly, the injection device (4), the infiltration box (5) and the mold (6) were assembled and fixed on the pultrusion platform. 140 bundles of carbon fibers (1) were pulled out from the creel. Simultaneously, two peel plies (2a, 2b) were pulled out from the creel and then passed through the guide/preforming plate (3), the infiltration box (5) and the mold (6) together with the carbon fibers (1). Thereafter, they were drawn forward by the traction device until the carbon fibers were all drawn smoothly. The peel ply (2a) was close to the upper side (5i) of the infiltration box (5), while the peel ply (2b) was close to the lower side (5j) of the infiltration box. The heating device of the mold (6) was turned on. The mold temperature from the inlet to the outlet was controlled as follows: 80° C./180° C./190° C. Upon the temperature being stable, the injection machine was turned on. The isocyanate component and polyol component B (100 parts of polyol component 1:4 parts of polyol component 2) were continuously pumped to the static mixing head at a weight ratio of 100:130. After being mixed by the mixing head, the resin was injected into the injection channel via the injection ports (4a, 4b) on both sides (5i, 5j) of the infiltration box (5). The resin was evenly injected into the infiltration box via multiple opening son the injection channel, and filled the infiltration box completely (average injection speed of 110 g/min). Thus, the carbon fibers (1) and the peel plies (2) were fully immersed. The injection pressure in the infiltration box (5) was controlled at 0.1-15 bar. The carbon fibers (1) and the peel plies (2a, 2b) immersed in the infiltration box (5) were continuously drawn through the mold (6) by the traction device 8 at a speed of 0.5 m/min. After being pulled out from the mold, the plate was smooth and without dry yarns. When the resulting pultruded polyurethane composite/profile was knocked with a metal part at a distance of 1 meter away from the mold, it sounded clear, which indicates that the infiltration and curing was good.

Before the further processing of the resulting pultruded polyurethane composite/profile, the peel plies should be removed, so that a pultruded polyurethane composite/profile with the desired surfaces can be obtained.

It can be seen from the experimental results of above examples 1 and 2 that the method for preparing a pultruded polyurethane composite of the present invention can provide a pultruded polyurethane composite with good infiltration and curing. Whether using glass fibers or carbon fibers, a pultruded polyurethane composite with satisfactory surfaces and high quality can be provided. In addition, the polyurethane composition of the present invention has a shorter curing time and a longer gel time, so that it is better and more flexible (for example in terms of infiltration and molding for a longer time) to be used for preparing pultruded polyurethane composites, especially of large-scaled pultruded polyurethane composites.

While the present invention has been described in detail as above, it is understood that the detailed description is only exemplary. In addition to the contents explicitly defined by the claims, various changes can be made by those skilled in the art without departing from the spirit and scope of the present invention.

What is claimed is:

1. A method for preparing a pultruded polyurethane composite comprising:
    placing at least a peel ply and at least a fibrous reinforcing material in an infiltration box of an equipment comprising an injection device, wherein the injection device comprises at least two injection ports located on two opposite sides of the infiltration box, and at least one injection channel which communicates with and is fed through the at least two injection ports, wherein the infiltration box comprises an inlet and an outlet, wherein the fibrous reinforcing material is partially covered by the peel ply, wherein the peel ply and the fibrous reinforcing material are drawn through the infiltration box at a certain speed by a continuous pultrusion process;
    infiltrating the fibrous reinforcing material with a polyurethane composition via the part of the fibrous reinforcing material not covered by the peel ply;
    drawing the infiltrated fibrous reinforcing material and the peel ply through a mold; and
    curing to obtain the pultruded polyurethane composite.

2. The method according to claim 1, wherein the at least a peel ply comprises two peel plies wherein the two peel plies are placed on two opposite inner sides of the infiltration box respectively, and wherein the fibrous reinforcing material is located between the two peel plies.

3. The method according to claim 1, wherein the speed at which the infiltrated fibrous reinforcing material and the peel ply are drawn through the mold is in a range of 0.2-2 m/min and the polyurethane composition is injected into the infiltration box by the injection device at a speed in a range of 30-2000 g/min.

4. The method according to claim 3, wherein there are at least two openings and/or at least one slit on the injection channel, and wherein the diameter of the openings is in a range of 0.5-5 mm.

5. The method according to claim 4, wherein the diameter of the openings is in a range of 1.5-3 mm.

6. The method according to claim 3, wherein the speed at which the infiltrated fibrous reinforcing material and the peel ply are drawn through the mold is in a range of 0.2-1.5 m/min.

7. The method according to claim 3, wherein the polyurethane composition is injected into the infiltration box by the injection device at a speed in a range of 60-1200 g/min.

8. The method according to claim 1, wherein the polyurethane composition comprises the following components:
    a component A, comprising one or more organic polyisocyanates;
    a component B, comprising:
        B1) one or more organic polyols in an amount of 21-60 wt. % based on the total weight of the polyurethane composition as 100 wt. %;
        B2) one or more compounds with the structure of formula (I) in an amount of 0-35 wt. %, based on the total weight of the polyurethane composition as 100 wt. %,

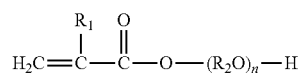

wherein, R1 is selected from hydrogen, methyl or ethyl; R2 is selected from alkylenes having 2-6 carbon atoms, propylene-2,2-di(4-phenylene), 1,4-xylylene, 1,3-xylylene, 1,2-xylylene; and n is an integer selected from 1-6; and
    a component C, comprising a free radical initiator.

9. The method according to claim 8, wherein the component B comprises B1) one or more organic polyols in an amount of 21-40 wt. % based on the total weight of the polyurethane composition as 100 wt. %.

10. The method according to claim 8, wherein the component B comprises B2) one or more compounds with the structure of formula (I) in an amount of 4.6-35 wt. % based on the total weight of the polyurethane composition as 100 wt. %.

11. An equipment for preparing a pultruded polyurethane composite, the equipment comprising an injection device and an infiltration box, wherein the injection device comprises at least one injection channel and at least two injection ports, wherein the at least two injection ports are located on two opposite sides of the infiltration box, and wherein the at least one injection channel communicates with and is fed through the at least two injection ports, and wherein the infiltration box comprises an inlet and an outlet, wherein preparing the pultruded polyurethane composite comprises:

placing at least a peel ply and at least a fibrous reinforcing material in the infiltration box, wherein the fibrous reinforcing material is partially covered by the peel ply, wherein the peel ply and the fibrous reinforcing material are drawn through the infiltration box at a certain speed by a continuous pultrusion process;

infiltrating the fibrous reinforcing material with a polyurethane composition via the part of the fibrous reinforcing material not covered by the peel ply;

drawing the infiltrated fibrous reinforcing material and the peel ply through a mold; and curing to obtain the pultruded polyurethane composite.

12. The equipment according to claim 11, wherein there are at least two openings and/or at least one slit on the injection channel, and the diameter of the openings is in a range of 0.5-5 mm.

13. The equipment according to claim 12, wherein the center distance of the two farthest openings among said openings is of 5%-90% of the length of the injection channel.

14. The equipment according to claim 12, wherein the width of the slit is in a range of 0.5-4 mm and the length of the slit is in a range of 5%-90% of the length of the injection channel.

\* \* \* \* \*